US008545228B2

(12) United States Patent
Dobson

(10) Patent No.: US 8,545,228 B2
(45) Date of Patent: Oct. 1, 2013

(54) OBJECTS THAT INTERACT WITH A USER AT A VISCERAL LEVEL

(75) Inventor: Kelly Elizabeth Dobson, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 666 days.

(21) Appl. No.: 12/612,372

(22) Filed: Nov. 4, 2009

(65) Prior Publication Data

US 2010/0112537 A1 May 6, 2010

Related U.S. Application Data

(60) Provisional application No. 61/111,076, filed on Nov. 4, 2008.

(51) Int. Cl.
*G09B 19/00* (2006.01)

(52) U.S. Cl.
USPC .......................................... 434/236; 600/529

(58) Field of Classification Search
USPC ........... 434/236, 262–275, 322–350; 600/28, 600/324, 527–530
See application file for complete search history.

(56) References Cited

U.S. PATENT DOCUMENTS 6,064,964 A * 5/2000 Yamamoto et al. ........... 704/270
8,002,711 B2 * 8/2011 Wood et al. ................... 600/529

OTHER PUBLICATIONS

A breathing robot, Jun. 14, 2007, post by cati (apparently, Cati Vaucelle) on Architectradure blog, archived at http://www.architectradure.com/2007/06.

* cited by examiner

*Primary Examiner* — Timothy A Musselman
(74) *Attorney, Agent, or Firm* — Stephen R. Otis

(57) ABSTRACT

Objects that interact with a user at a visceral level when the object comes within the user's personal environment. The objects detect a user's visceral behavior, for example breathing pattern or perspiration. In response to the visceral behavior the object simulates a behavior of a living entity such as breathing, or produces an output to which the user responds viscerally, such as an electric field. The form of the output or simulated behavior is determined by the visceral behavior. The output or simulated behavior may be modified to guide the user's visceral behavior, for example by first synchronizing simulated breathing to the user's breathing and then slowing down while the user's breathing is entrained to the simulated breathing. One such object has a skin that is warm to the touch, and simulates breathing with a breathing sound. Another such object produces electric fields like electric fields of the heart. A further such object simulates a purring sound in response to the user's breathing: the form of the purring also depends on sounds in the environment.

16 Claims, 14 Drawing Sheets

Overview

Overview

OMO

Overview
OMO architecture

OMO

OMO

OMO

Interaction

Breathing cycles 1200                1210

1230

1250                1260

1270

UMO, AMO

Overview
UMO Architecture

Overview
AMO Architecture

OBJECTS THAT INTERACT WITH A USER AT A VISCERAL LEVEL

CROSS-REFERENCE TO RELATED APPLICATIONS

This patent application claims priority from U.S. Provisional Patent Application 61/111,076, Dobson, Transobjects that interact with a user at a visceral level, filed Nov. 4, 2008, which is hereby incorporated by reference in its entirety for all permissible purposes.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The techniques and embodiments disclosed herein relate generally to non-living objects to which humans respond at a visceral level and more specifically to non-living objects with which humans interact at a visceral level.

2. Description of Related Art

Related art to the techniques disclosed herein can be found in the following areas:

Biofeedback Devices

A biofeedback device is an instrument that measures a physiological function not normally sensed or controlled by the user consciously and displays information about the measurement to the user. The user can thus become aware of the physiological function consciously, and perhaps train herself/himself to control it consciously.

An example of a biofeedback device is the StressEraser: The StressEraser is a personal biofeedback device that detects the user's pulse using a non-invasive detector, and displays to the user a heart rate variability wave representing the beat-to-beat variations in the user's heart rate. Information on the StressEraser can be found at www.stresseraser.com (reference fetched 28 Sep. 2009).

Human-Machine Relationships

The inventor's PhD thesis, published Nov. 12, 2008, Kelly Dobson, "*Machine Therapy*", Ph.D. Thesis, Massachusetts Institute of Technology, explores human-machine relationships. One part of that exploration is the inventions disclosed herein. Another part describes how humans find it enjoyable to "sing along" with sounds generated by heavy equipment or by household appliances such as blenders. Another part describes previously-published work in which the inventor modified a kitchen blender so that the blender, termed "Blendie" in the thesis, responded to a user's voice by adjusting its own motor speed to match the dominant pitch and power of the user's voice.

PROBLEMS OF RELATED ART

A number of problems may be found in the related art, including limits to interactions between the object and a human, such as the following.

The object's interaction with the human or the human's response to the object is not visceral:

The term visceral in this context refers to "having to do with the response of the body as opposed to the intellect, as in the distinction between thinking and feeling" (see allwords.com, wiktionary.com, fact-archive.com, www.artandpopularculture.com, www.bittermancircle.com, www.artbabble.org, all fetched October 2009). Humans may respond to stimuli not only by a conscious behavior, but also by a visceral behavior that is below the level of conscious perception. An interaction between a user and an object can be in whole or in part a visceral interaction, i.e. an interaction at the visceral level. Breathing when not controlled consciously, electric fields of the heart, pulse, and perspiration are examples of visceral behaviors.

The form of the object's output is not determined by the human's visceral behavior:

In this context, the form of an output being determined by a visceral behavior refers to a characteristic of the output being determined by a characteristic of the behavior. For example, an object may product an output that is a simulated purring sound with characteristics such as purr rate and dominant frequency, and the characteristics of the simulated purring may depend on the user's visceral breathing rate.

The output does not guide a visceral behavior of the human:

In this context, an output guiding a behavior refers to modifying an output to affect the behavior being guided. For example, an object may output simulated breathing output, and once the user's breathing has become entrained to match the simulated breathing output, the object may gradually change the simulated breathing so that the user's breathing behavior remains entrained and follows the changes in the simulated breathing output, thus guiding the breathing behavior of the user.

It is an object of the present invention to provide ways of implementing and using objects that interact with a user viscerally. Another object of the present invention is to provide ways of implementing and using objects whose output has a form determined by a user's visceral behavior. It is a further object of the present invention to provide ways of implementing and using objects that interact with a user to guide a behavior of the user.

BRIEF SUMMARY OF THE INVENTION

An object of the invention is achieved by an apparatus having a detector: when the detector comes within the personal environment of the user, the detector detects a visceral behavior of the user and the apparatus responds to the detector by simulating a behavior of a living entity. The form of the simulated behavior is determined at least in part by the visceral behavior. The visceral behavior and the simulated behavior may be of the same class, and the simulated behavior may be such that it affects the user viscerally. The apparatus may further modify the simulated behavior so that the simulated behavior is entrained with the user's visceral behavior, and may subsequently modify the simulated behavior to guide the visceral behavior of the user. The simulated behavior may be breathing, may be simulated breathing motion, and may further include a breathing sound.

The apparatus may also have a surface portion that feels warm to the touch of the user, and may have a shape that is approximately ovoid.

In a further aspect, the simulated behavior may be determined at least in part by the user's personal environment, and may include a sound which may be a purring sound.

In another aspect, an object of the invention is achieved by an apparatus having a detector: when the detector comes into the personal environment of the user, the detector detects a visceral behavior of the user and the apparatus responds to the detector by producing an output that affects the user viscerally. The form of the output is determined at least in part by the visceral behavior. The form of the output may also be determined by the apparatus' external environment as well as the user's personal environment.

Upon perusal of the Detailed Description and drawing below, other objects and advantages will be apparent to those skilled in the arts to which the invention pertains.

BRIEF DESCRIPTION OF THE SEVERAL VIEWS OF THE DRAWINGS

FIG. 10 is flowcharts showing of OMO's interaction with.

Figure 1:
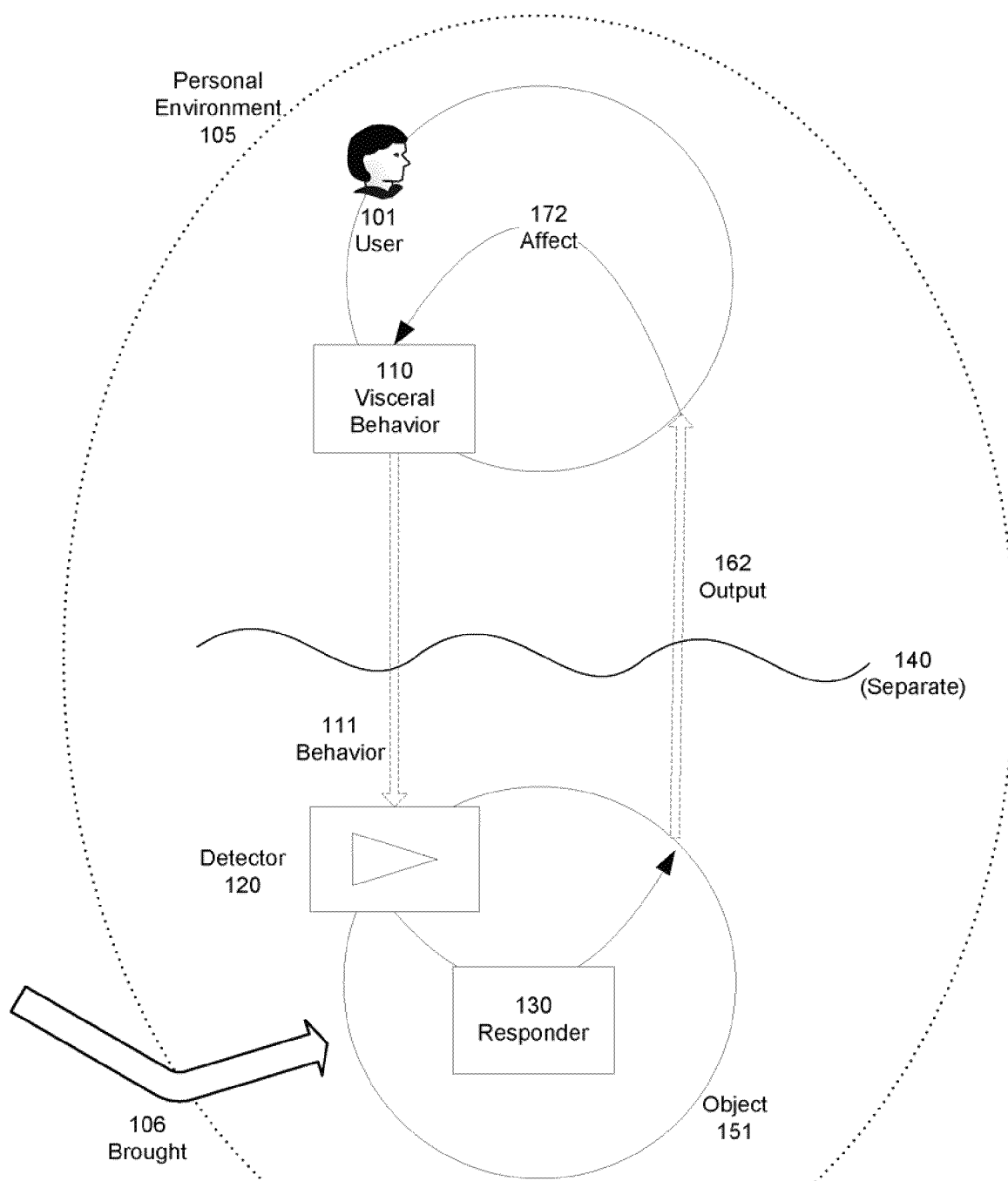
FIG. 1 shows in overview techniques for an object that interacts with a user at a visceral level.

Reference numbers in the drawings have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description of the invention discloses embodiments of objects that interact with a user at a visceral level, including objects whose output has a form that is determined by a visceral behavior of a user and objects that interact with a user to guide a visceral behavior of the user.

In the following discussions of interactions between a human and an object, the human may be referred to as the user of the object Overview of Objects that Interact with a User at a Visceral Level The objects described herein interact with a user at a visceral level. For example, the object responds to a visceral behavior by the user by producing an output that the user responds to, and the output is modified by the object to affect a behavior of the user.

In one aspect of the present invention, the object interacts with the user when the object is brought within the user's personal environment. In this context the user's personal environment is the space within which the object detects the user's visceral behavior. The user can choose whether he or she will interact with the object by choosing to bring the object within the user's personal environment.

The behavior that the object responds to may be a visceral behavior of the user, and the output may be an output to which the user responds viscerally. The object may also modify the output to guide a behavior by the user.

FIG. 1 presents an overview of an object that interacts at a visceral level with the object's user when the object comes into the user's personal environment.

Object 151 is separate from user 101, as indicated by waved line 140. User 101 brings object 151 within user 101's personal environment 105, as illustrated by arrow 106. User 101 has a visceral behavior 110. Object 151 has detector 120 that detects visceral behavior 110 of user 101, as shown at 111, when object 151 has come within personal environment 105. Responder 130 responds to detector 120 by producing output 162. As shown at 172, user 101 responds to output 102. Output 162 may be of the same class as detected visceral behavior 110 or it may be of a different class: in either case, responder 130 may modify output 162. One purpose of such modification is to produce a change in the visceral behavior that is detected by detector 120.

The following discussion describes presently-preferred embodiments of exemplary species of the present invention:

OMO detects visceral breathing behavior of the user and responds with simulated breathing behavior output. The user responds viscerally to the simulated breathing behavior.

UMO detects visceral breathing behavior of the user and sound aspects of the environment, including infrasound vibrations, and responds by producing a purring sound output which may include infrasound vibrations and to which the user may respond viscerally.

AMO detects the pulse of the user and responds with electric field outputs. The user responds viscerally to the electric field outputs.

Overview of "OMO"

OMO is an embodiment of a species of the present invention in which the object detects a visceral behavior by the user and produces an output that is a simulation of a behavior of the same class. OMO detects the user's breathing when the user holds OMO against the user's torso and responds by an output of simulated breathing. This is illustrated in FIG. 2 and FIG. 3.

OMO's External Shape

Figure 2:
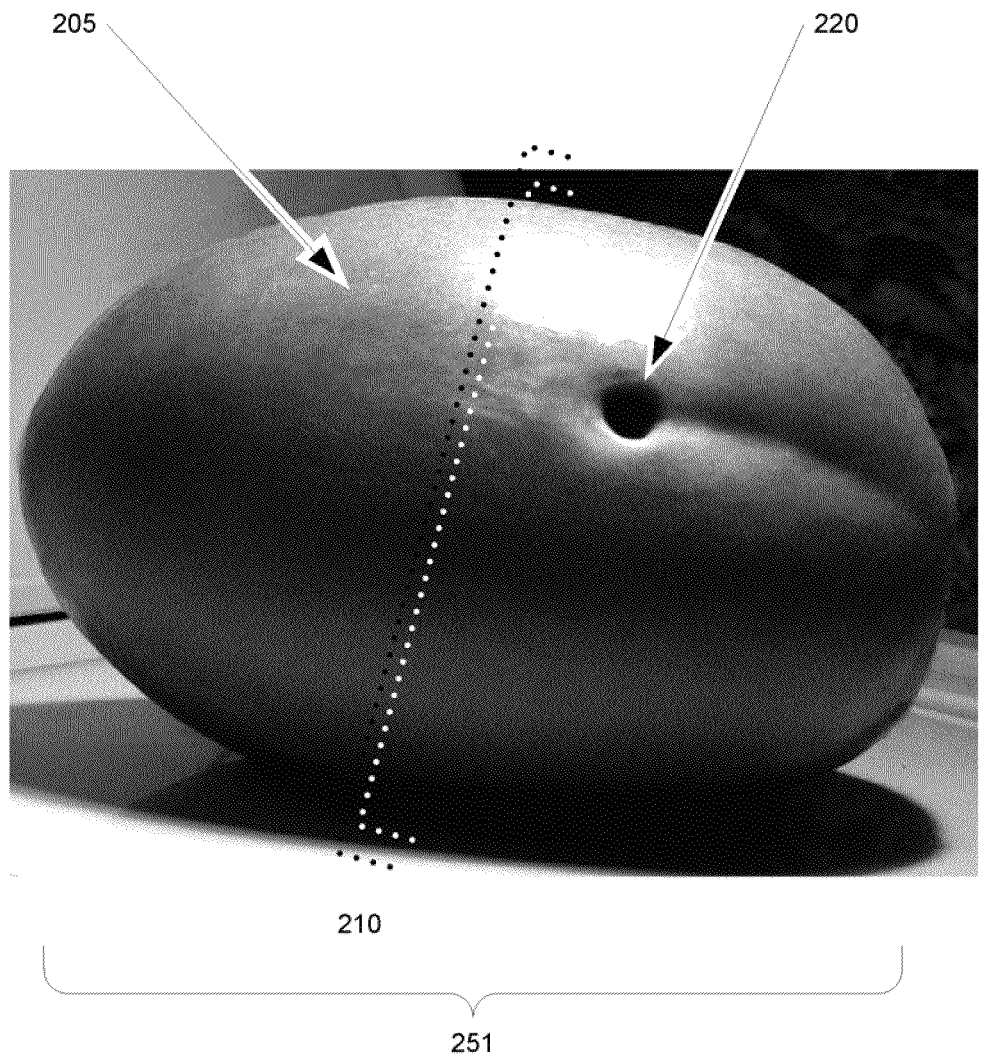
FIG. 2 shows an external view of a presently-preferred embodiment of OMO.
Figure 3:
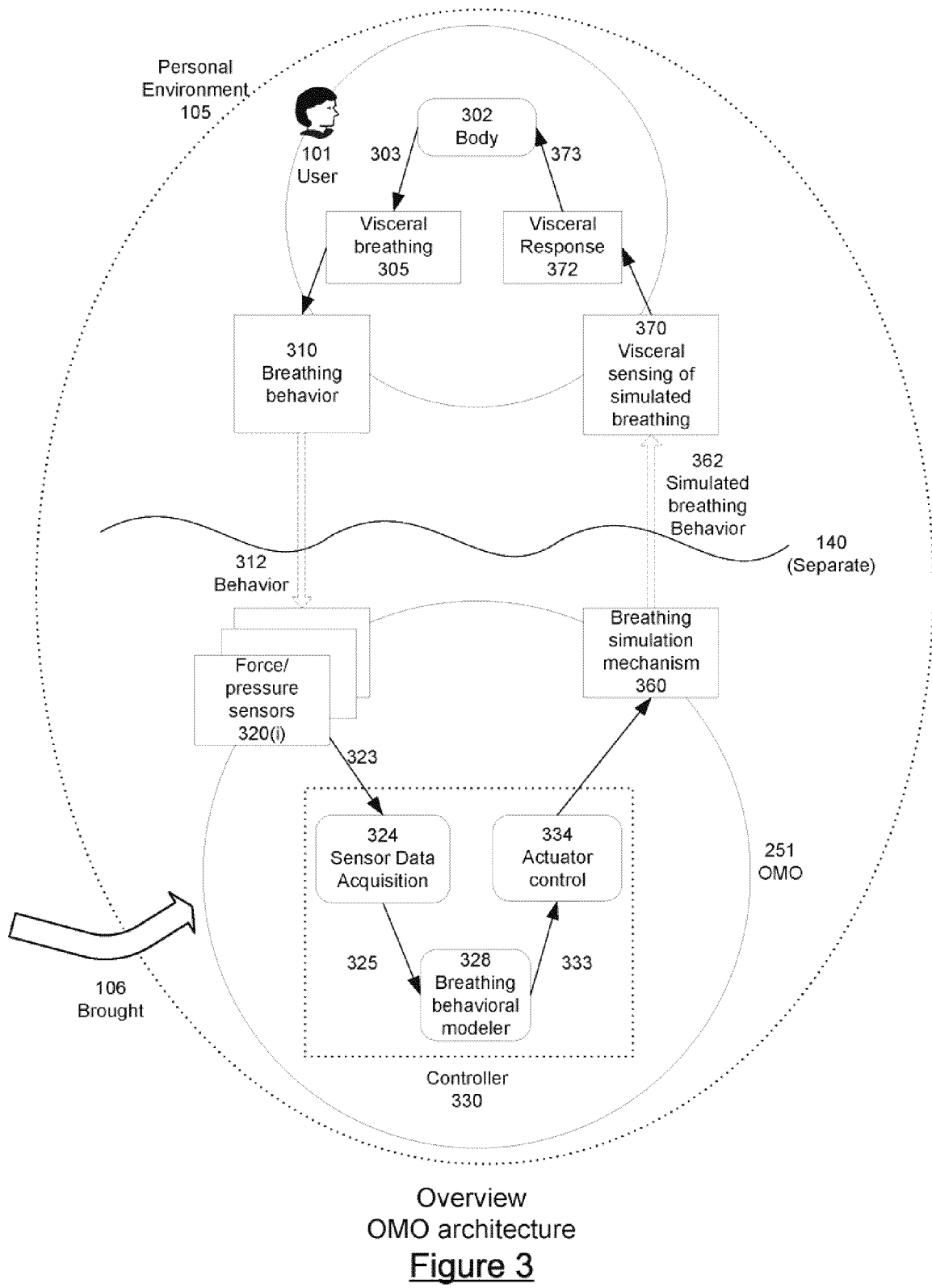
FIG. 3 shows in overview how OMO interacts with OMO's user.

FIG. 2 shows an external view of OMO 251.

OMO 251 has a roughly ovoid organic shape as shown: this form is chosen to invite the user to hold OMO 251 against the user's front torso either in the lap or cradling in one's arms. OMO 251 is covered by soft elastomeric skin 205: the color of skin 205 is chosen to be comfortable and inviting. The material of skin 205 is chosen such that it feels warm like a living body to the user's touch. OMO 251 simulates breathing by expanding and contracting, as indicated at 210. Breathing hole 220 in OMO's skin 205 allows air to be blown out of or drawn into the interior of OMO 251 as OMO 251 expands and contracts. As air passes through breathing hole 220 during simulated breathing, breathing hole 220 produces a breath-like sound. In other embodiments, no audible breathing sound may be produced.

How OMO Interacts with OMO's User

FIG. 3 illustrates how OMO interacts with OMO's user.

As indicated by arrow 106, user 101 brings OMO 251 into user 101's personal environment 105 by holding OMO 251 against user 101's torso, such as by holding it in user 101's arms or on user 101's lap. User 101's body 302 exhibits visceral breathing behavior 310 as shown at 305 when user 101 is not consciously controlling breathing. Force/pressure sensors 320(*i*) of OMO 251 detect user 101's breathing behavior 312 when OMO 251 is held against user 101's torso. OMO 251 has controller 330, which has sensor data acquisition component 324, behavioral modeler component 328, and actuator control component 334.

Sensor data acquisition component 324 obtains input 323 from force/pressure sensors 320(*i*), and makes the value available to behavior modeler 328, as shown at 325. Behavior modeler 328 determines an output from value 325, and provides signals 333 to actuator control 334, which in turn operates breathing simulation mechanism 360 to produce output as simulated breathing behavior 362.

Simulated breathing behavior 362 is sensed viscerally by user 101, as shown at 370. User 101's body responds viscerally, as shown at 372. 303 and 373 indicate that user 1.01's body 302 responds viscerally to output 362 by changing user 101's visceral breathing rate.

Details of OMO
Breathing Mechanism

Figure 4:
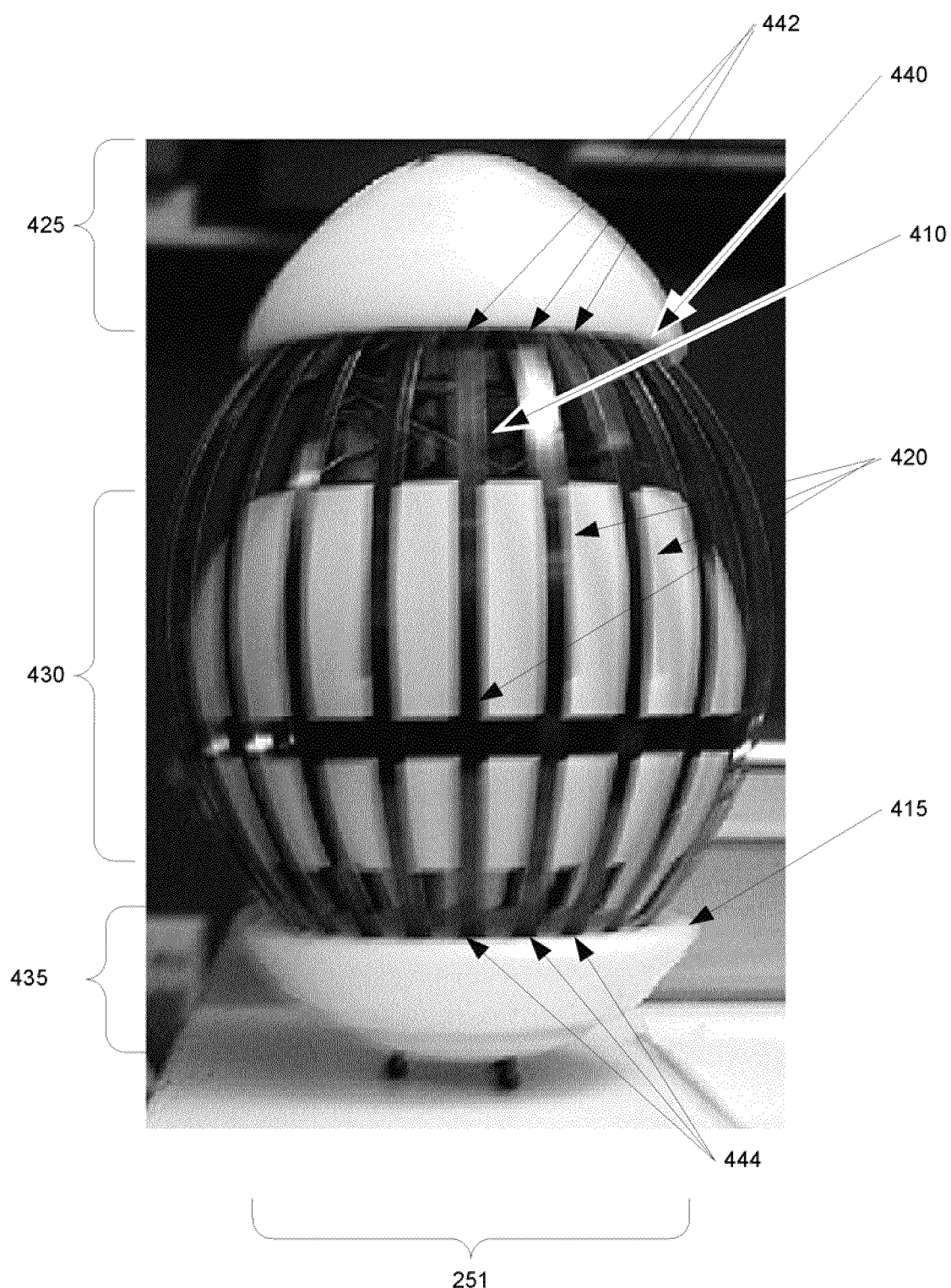
FIG. 4 shows an exterior view of OMO's mechanism for simulating breathing.

FIG. 4 shows an exterior view of the simulated breathing mechanism. OMO 251 has internal cavity 410 within ribs 420 containing mechanical and electrical parts for movement to simulate breathing. Breathing movement of OMO 251 is implemented using a set of flexible steel ribs 420 whose curvature is changed by an actuator mechanism containing a brushless DC motor. Ribs 420 curve around inner shell 430. Top ends 442 and bottom ends 444 of ribs 420 are fixed via rib socket 440 (inside top shell 425) and bottom rib holder 415 respectively to the actuator mechanism that changes the distance between ends 442 and 444 of ribs 420, thus causing ribs 420 to flex outward more or less and to cause OMO 251 to expand and contract, thereby causing skin 205 to act as a bellows to move air in and out of the interior of OMO 251 through breathing hole 220.

Figure 5:
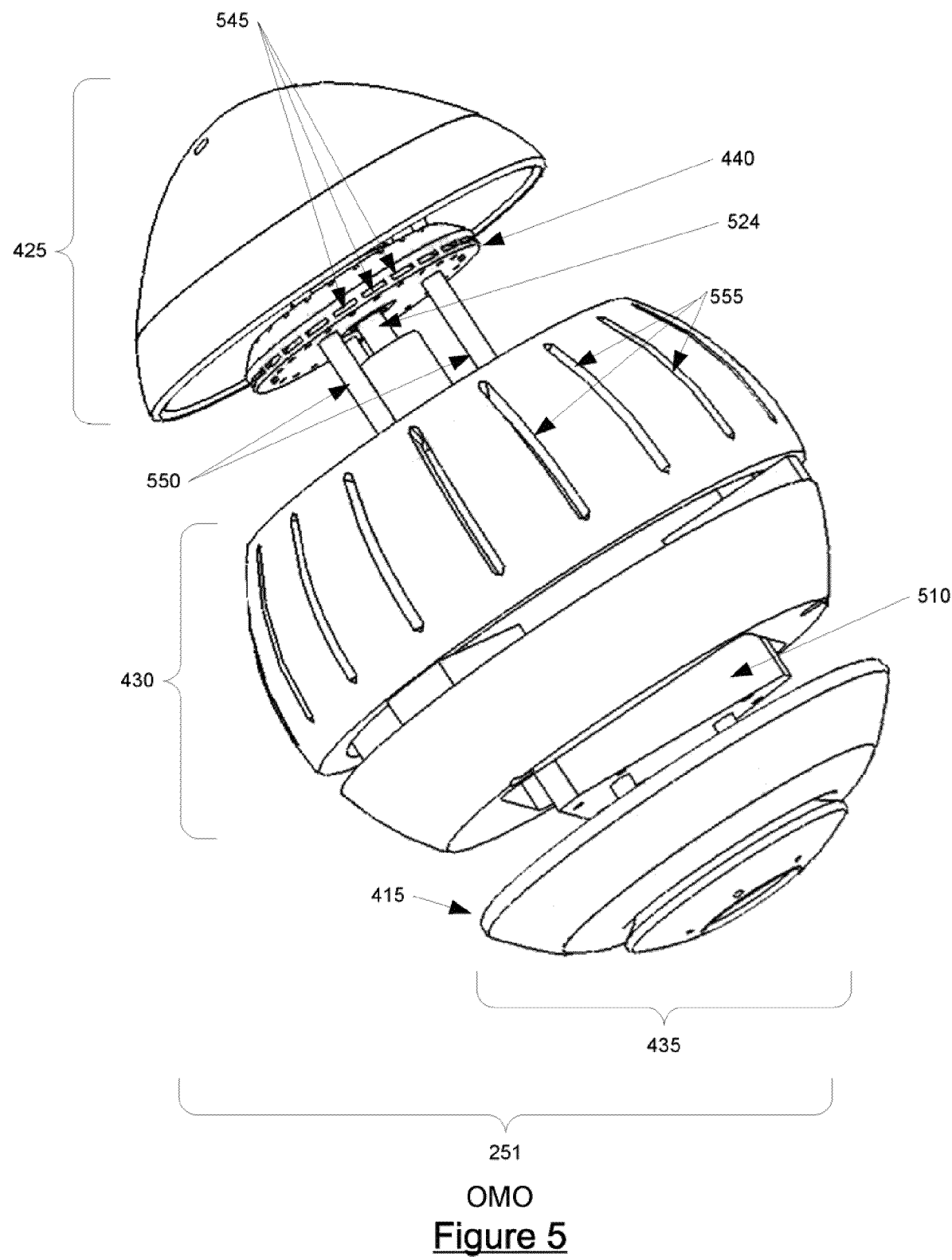
FIG. 5 shows a first view of OMO's mechanism for simulating breathing.
Figure 6:
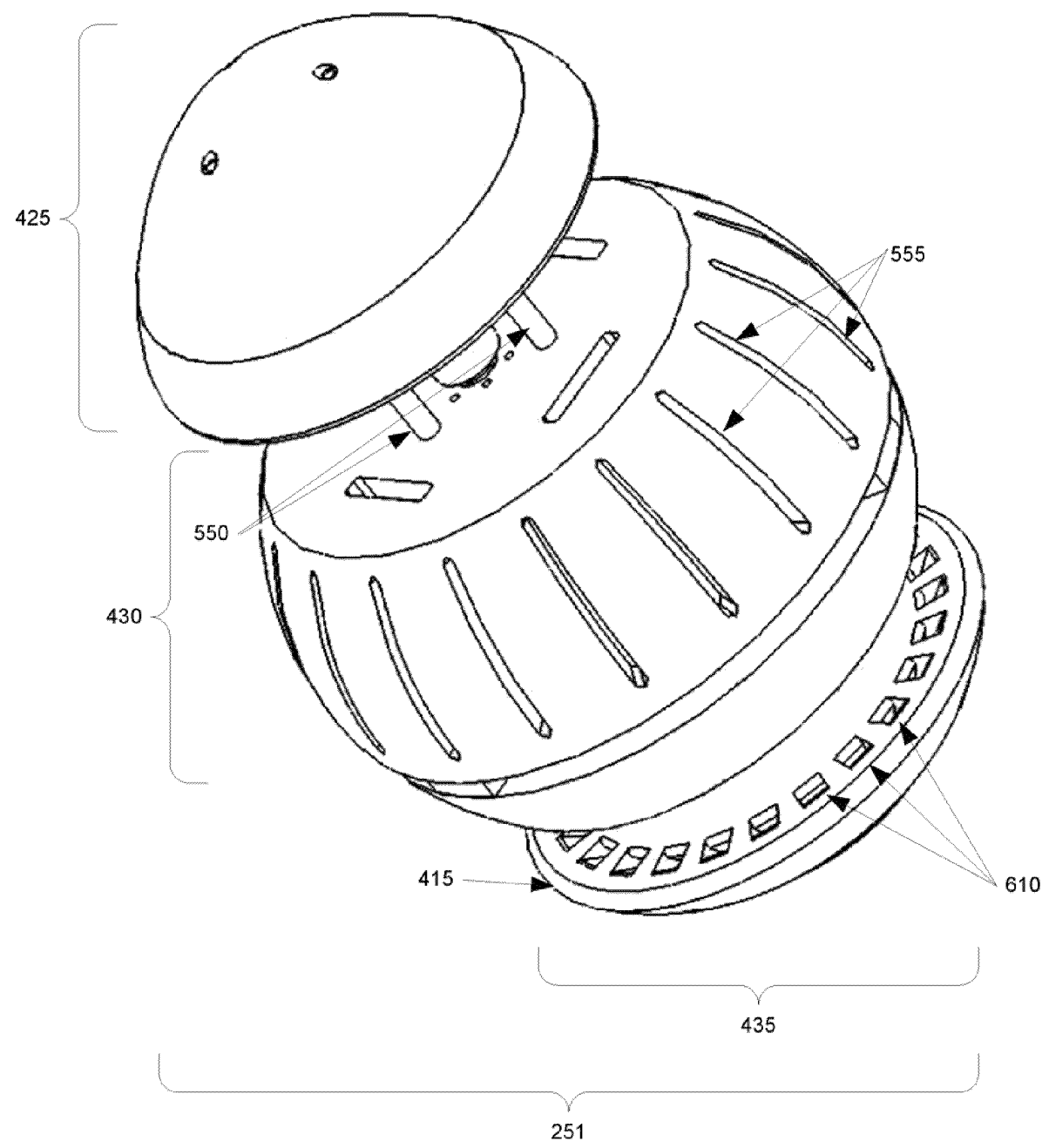
FIG. 6 shows a second view of OMO's mechanism for simulating breathing.

FIG. 5 and FIG. 6 illustrate further details of the breathing mechanism.

The motor of the breathing mechanism is contained in motor silencing housing 510. Motor housing 510 is attached to the inside top of lower inner shell 435. The shaft of the motor is attached to lead screw 524, and the other end of lead screw 524 is held in a bearing that is press fit into the inside center of upper shell 425: this bearing allows lead screw 524 to turn freely. Nut 535, press fit and screwed into top rib socket 440, rides up and down on lead screw 524 as lead screw 524 is turned by the motor. Rib socket 440 holds the top of each rib 420 in one of 24 inset holes visible at 545. Holes 610 in bottom rib holder 415 hold the bottom of every rib 420. Bottom rib holder 415 is secured in place in relation to upper shell 425 by three structural positioning rods 550. Top rib socket 440 has bearing holes that allow top rib socket 440 to move smoothly up and down on structural positioning rods 430 as lead screw 524 turns. Positioning rods 430 are secured into upper shell 425 at one end and lower shell 435 at the other end.

Also visible are inner shell 430 with rib guide slots 555 that keep ribs 420 aligned and provide structural integrity. Inner shell 430 limits the extent to which ribs 420 can be pressed inwards by squeezing OMO 251. Inner shell 430 is attached to positioning rods 430 by two-pieced clamp-on collars clamped to positioning rods 550 and attached by screws to inner shell 430.

Of course, any mechanism that produces simulated breathing may be employed in OMO.

Sensors

Figure 7:
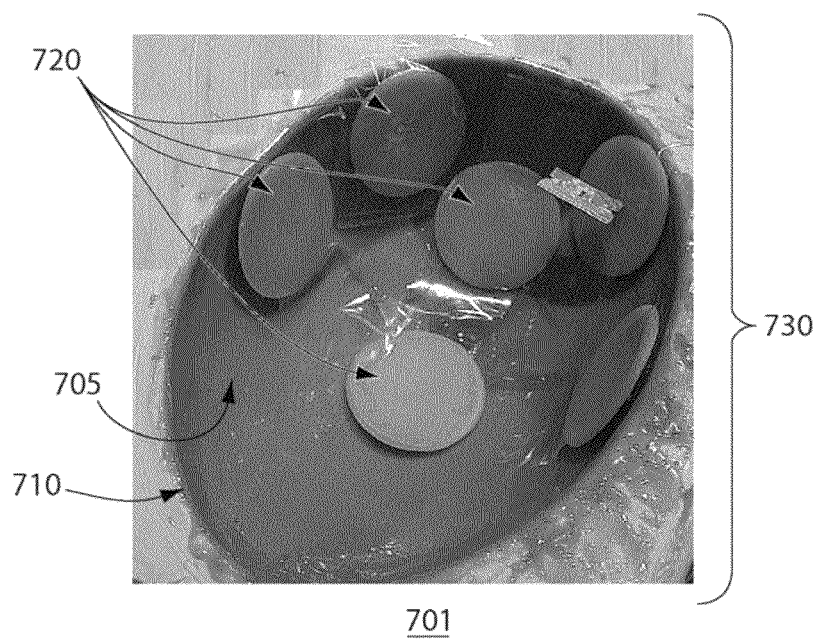
FIG. 7 shows the construction and placement of OMO's sensors in OMO's skin.
Figure 8:
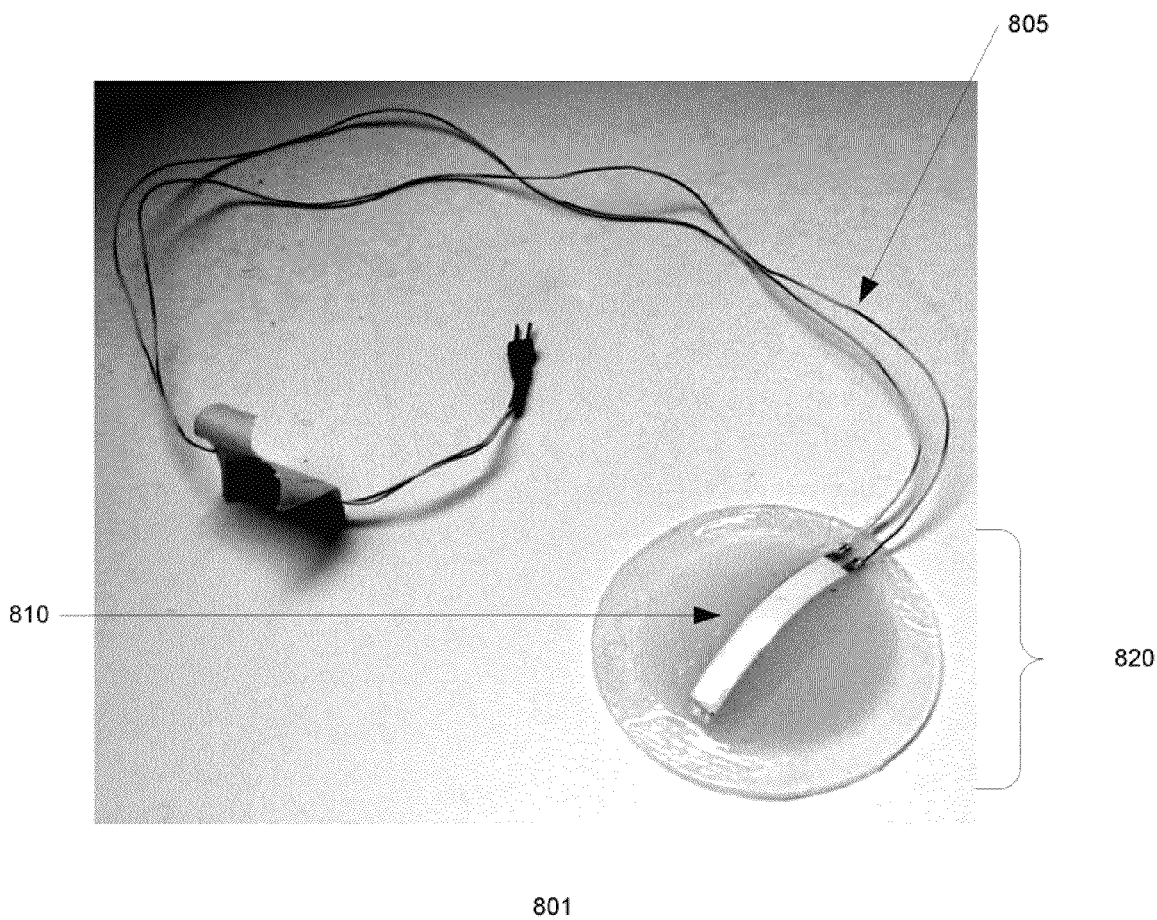
FIG. 8 shows the construction of the force/pressure sensors employed in OMO.

FIG. 7 shows a step in the construction of OMO 251's skin 205, and the array placement of sensors units 801 (shown in FIG. 8). FIG. 7 shows at 701 the outermost layer 710 of skin 205: skin 205 is cast in two separate halves of a mold form with inner and outer molds, one of which is shown at 730.

Before casting the middle elastomeric layer (not shown) of skin 205, wax placeholders such as those indicated by arrows 720 are secured to inner side 705 of outer layer 710 where sensor units 801 will be placed. Wax placeholders 720 are removed after casting of the outer layer 710 is complete, sensor units 801 are placed in the spaces left by wax placeholders 720, and the thicker middle layer and the inner layer (not shown) of skin 205 added. Eight sensor units 801 are thus spaced more or less evenly in skin 205.

FIG. 8 shows the construction of the force/pressure sensor units 801 employed in OMO 251.

Sensor units 801 employ Quantum Tunneling Composite (QTC) sensors. QTC sensors provide logarithmic response across a wide range of sensed force, such that OMO 251 can detect and distinguish with the same sensor a smooth gradient of pressures from a very light feather touch to an inhumanly hard squeeze.

In each sensor unit 801, QTC sensor 810 is affixed to a mounting substrate 820 having a slight curviplanar shape approximating a dome. Substrates 820 are slightly less thick than the thickness of skin 205. The combined sensor unit 801 is mounted under the outer surface of skin 205: pressure from contact with user 101's body pushes on skin 205 which in turn presses against sensor unit 801. Substrate 820 is only slightly harder than that of the surrounding material when mounted in skin 205: the curviplanar shape and the thickness of sensor unit 801 render sensors 810 not generally noticeable by user 101 when user 101 is interacting with OMO 251. The dome shape of each sensor unit 801 focuses applied pressure towards QTC sensor 810, so that sensor 810 responds to pressure across a wider area rather than at a single point, providing good pressure detection of contact with user 101's torso substantially across the entire surface of OMO 251.

Of course, any other kind of sensors or arrangement or combination of sensors that serve the purpose may be employed in OMO, such as fiber-optic bend sensors extending around OMO, or a woven or knit sensor fabric as part of or a covering for OMO's skin. Force Sensitive Resistors may also be employed as sensors; however their response is linear and may be able to distinguish only a limited range of pressures.

Controller and Other Components

Figure 9:
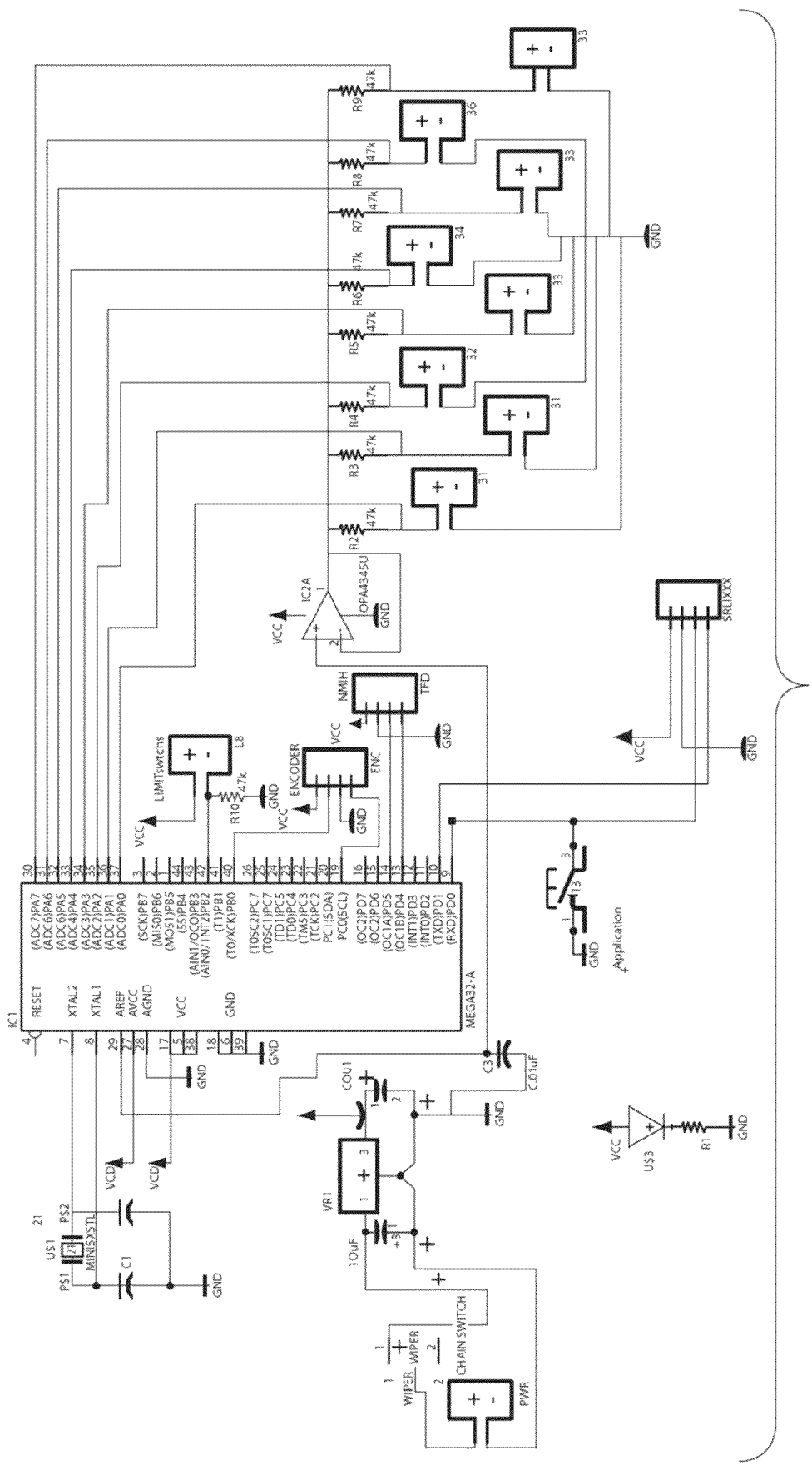
FIG. 9 shows a general schematic of the controller employed in OMO.

FIG. 9 shows a general schematic of a presently-preferred embodiment of controller 330. Controller 330 is implemented using a double-sided surface mount electronic board 901 based on the Number Six board by Computing Culture (web.media.mit.edu/~nvawter/usb6/, weblogs.media.mit.edu/compcult. references fetched 11 Oct. 2009) which is in turn based on the Atmel AtMega32 microcontroller (www.atmel.com, 11 Oct. 2009). FIG. 9 shows inputs 910 for eight sensors 810, AREF buffer 920, and logarithmic amplifier 930 for signal conditioning added to the original Number Six board design, as well as two limit switch inputs 935, interrupt line 940 to detect over-turns of lead screw 524 in the forward and backward directions by two limit switches to that are closed if lead screw 524 is ever over-turned. Any other arrangement or number of microcontrollers and sensors which performs functions similar to those of the microcontroller and sensors of the preferred embodiment may be employed as well.

Power for OMO 251's controller 330 and motor are provided by internal lithium-ion battery packs, one of which is indicated at 945. The battery packs are charged by connecting external charging cables to connectors through an access hole in OMO 251's skin 205. Alternatively a wireless charging mechanism may be employed or OMO 251 may be powered externally.

Software Implementation in the Controller

The general principles and techniques of software control and programming are known to practitioners of the relevant arts, thus only aspects particular to the embodiment need be described.

Software for the Atmel AtMega32 microcontroller for the OMO controller is written in "C". On power up in the present embodiment, start-up code of the software initializes core components of OMO 251, including eight sensors 810, a pulse-width modulator (PWM) circuit to control the breathing rib motor, the contact switches at the extreme of each motion cycle, the rotary encoder to determine the position of the breathing mechanism, and a serial console output for debugging.

inputs from sensors 810 are input to controller 330 as A/D conversions. The PWM circuit for controlling the motor can set direction and speed at the same time, and the motor mechanism returns encoder "ticks" for distance traveled through a quadrature encoder back to controller 330. The two limit switches connected to interrupt lines 940 of controller 330 cause the code to be paused and the controller to do a restart in the event of an overrun on lead screw 524.

After first initialization, controller 330 calibrates the rib motor by moving the motor backwards until OMO 251 is fully "breathed out" and the top contact switch is hit, then moving the motor forwards a set number of encoder ticks so that OMO 251 always begins simulated breathing from the same position. After calibration, an initial main breathing behavior loop begins, simulating relaxed breathing.

OMO's Behaviors and Interactions with OMO's User

When OMO 251 is held by user 101, OMO 251 first entrains its simulated breathing to the breathing of user 101, and then OMO 251 changes its simulated breathing behavior as described below. User 101 reacts viscerally to the simulated breathing of OMO 251 by user 101 reacting to unexpected changes in the simulated breathing of OMO 251, by user 101's breathing becoming entrained to the simulated breathing of OMO 251, and by user 101's breathing being guided by the simulated breathing of OMO 251.

Software of controller 330 is programmed to exhibit a set of behaviors in response to the visceral breathing behavior of user 101. OMO 251 first entrains its simulated breathing and user 101's breathing by synchronizing its simulated breathing to the detected breathing of user 101. Subsequently, OMO 251 changes its own simulated breathing pattern output to affect the visceral breathing of user 101. In the present embodiment, OMO 251 adjusts its simulated breath envelope and breathing rate slowly, so as to maintain entrainment with user 101's breathing while OMO 251 guides user 101's breathing behavior rate and pattern.

Details of Interaction

As described above, when initially not in user 101's personal environment, OMO 101 simulates relaxed breathing: the initial relaxed breathing is intended to attract user 101 to interact with OMO 251 by user 101 bringing OMO 251 into user 101's personal environment 105.

When first held against user 101's torso such that OMO 251 can detect user 101's breathing, OMO 251 determines four parameters characterizing user 101's breathing:

Frequency:
. . . the periodicity of user 101's breath cycle. In this embodiment, this is how many "cycles" (defined as the window detection length employed for a sensor) between a breath intake by user 101 and the next.

Breath intake phase:
. . . the time delta between OMO 251's start intake breath and that of user 101. In a zero phase circumstance, both OMO 251 and user 101 begin intake breaths at the same time.

Magnitude:
. . . the pressure on the sensor from user 101's torso or body as an indication of breath magnitude (how deeply user 101 is breathing).

inhale and exhale times and the ratio of inhale time to exhale time for each breath of the user. This is important in determining the affective state of the user via the user's breath—i.e. is the user sighing a lot, inhaling with quickness then languid exhale or vice versa etcetera— these types of breath patterns are linked physiologically to psychological and nervous system states.

The software of controller 330 adjusts OMO 251's simulated breathing to be entrained with user 101's breathing by continually detecting these parameters and slightly adjusting (at 10% increments) its own parameters of frequency, phase and magnitude (by controller 330 adjusting the direction and speed of the motor) to move towards the breathing parameters of user 101. A simple behavior in which OMO continually adjusted to match user 101's breathing was found to be non-effective: the time of entrainment was too long, and factors such as large movement by user 101 or sensor misreads would cause OMO 251's simulated breathing to appear erratic and unsettled to user 101.

An effective solution was found to the above problem by programming the software of controller 330 to employ a set of look-up instruction tables specifying a number of possible breathing patterns, such as normal breathing, deep breathing, hyperventilating, sighing, and laughing. The tables can be modified depending on the interactions desired. The software of controller 330 begins simulated breathing with a list of instruction values that define speed, pauses, and direction. The overall periodicity of the simulated breathing follows the breathing of user 101, but does not directly mimic every cycle; rather, there is a window size of several seconds during which simulated breathing continues as the software measures user 101's breathing and then makes a decision on the next chosen breath cycle.

Figure 10:
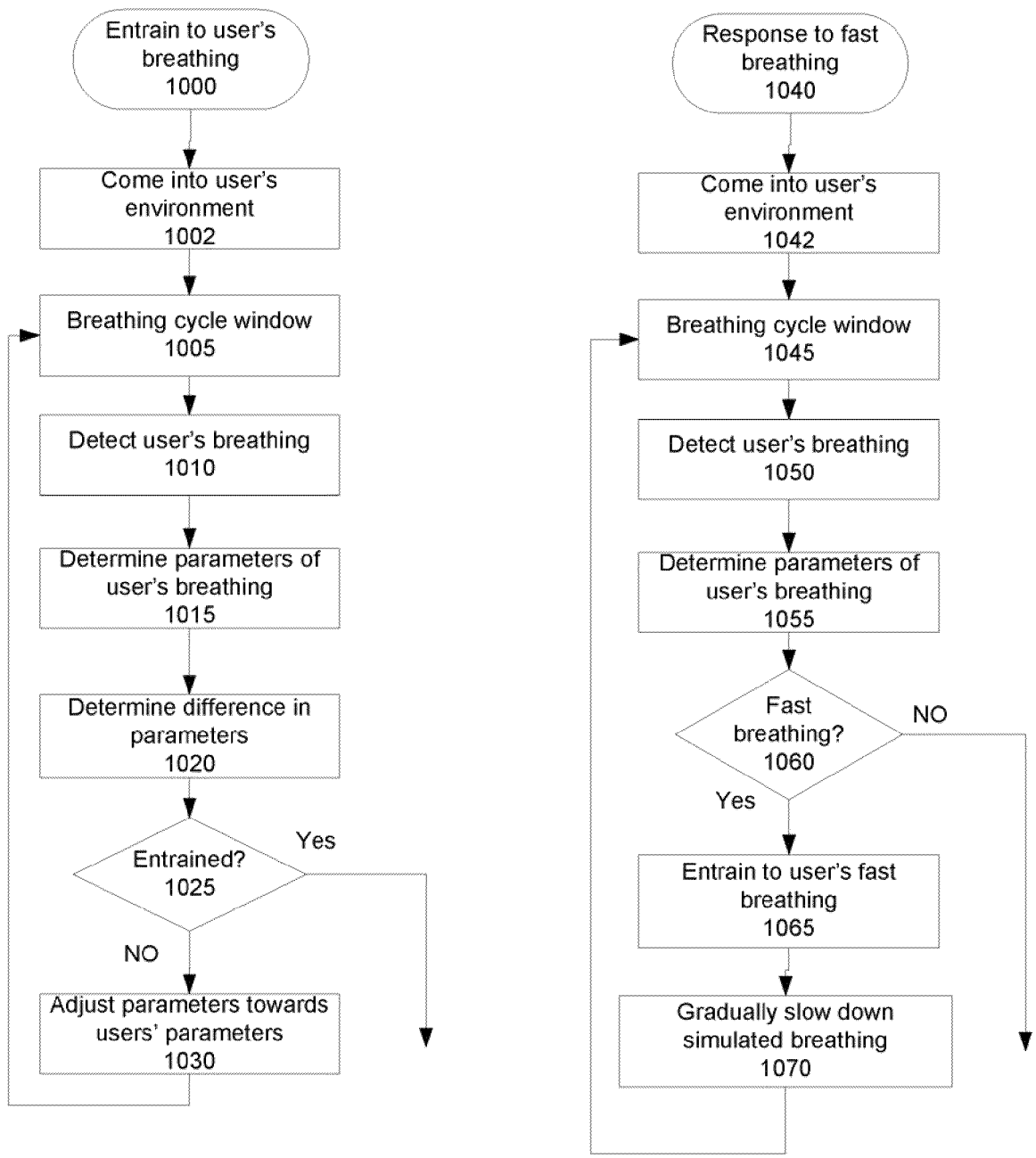
Figure 11:
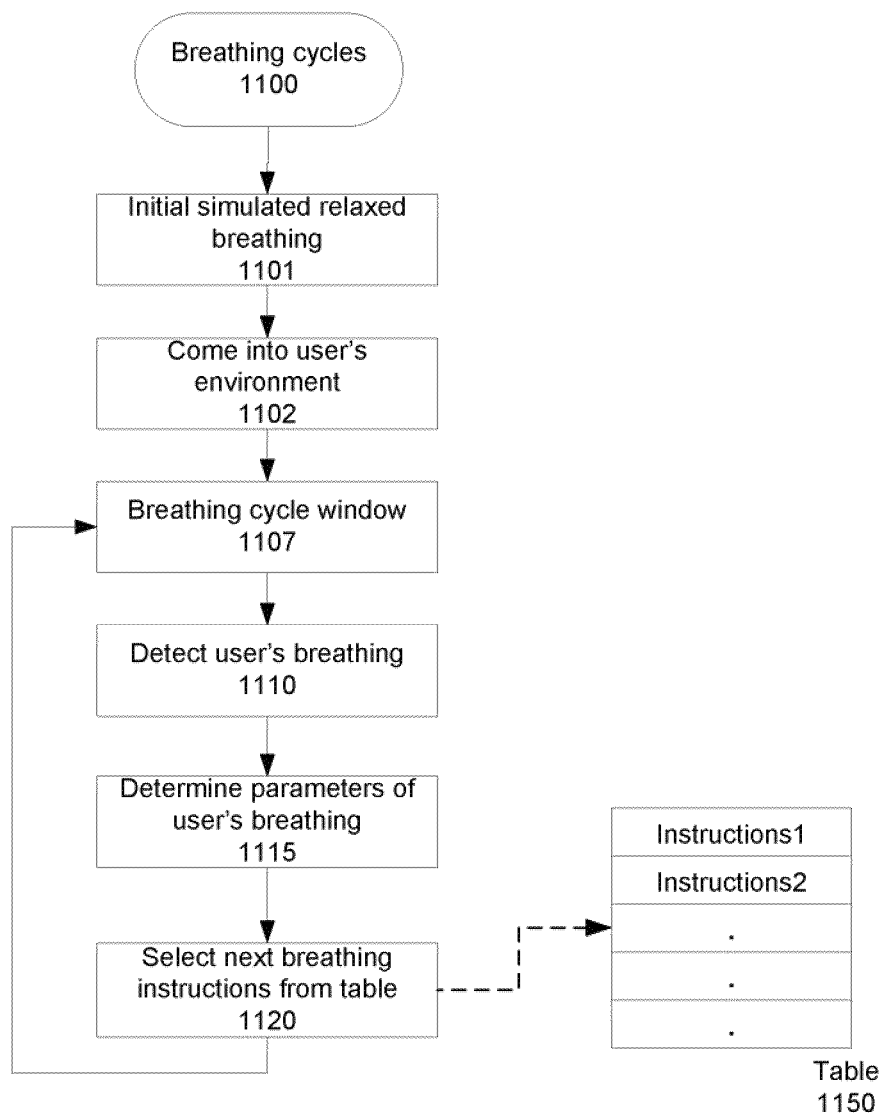
FIG. 11 is a flowchart showing OMO's breathing cycles

FIG. 10 and FIG. 11 illustrate embodiments of these interaction techniques in the form of flowcharts: many variations in implementation are readily apparent, and details not needed for understanding are omitted for clarity.

Flowchart 1000 illustrates the software of controller 330 adjusting OMO 251's simulated breathing to be entrained with user 101's breathing. After OMO 251 has come within user 101's personal environment (1002), a breathing cycle window occurs (1005). During the breathing cycle window, the software measures user 101's breathing and determines the parameters characterizing user 101's breathing (1015). The software then determines the differences between user 101's breathing parameters and the parameters of OMO 251's simulated breathing (1020). If the difference indicates that the simulated breathing is not entrained to user 101's breathing (1025), the software adjusts the parameters determining the simulated breathing towards the parameters of user 101's breathing (1030), and repeats the process in a following breathing cycle window (1005).

Flowchart 1040 illustrates how OMO 251 guides fast breathing by user 101 to a desired more relaxed breathing pattern. OMO 251 initially comes within user 101's personal environment (1042) during a breathing cycle window (1045). As in the related steps of flowchart 1000, the software detects user 101's breathing (1050) and determines the parameters of user 101's breathing (1055). If the user 101's breathing parameters indicate fast breathing (1060), the software entrains OMO 251's simulated breathing to user 101's breathing (1065), gradually slows down the simulated breathing (1070), and continues the process in following breathing cycle windows (1045) until the desired breathing rate is attained.

Flowchart 1100 illustrates the use of the look-up instruction tables. Initially the software simulates relaxed breathing (1101). As in the related steps of flowcharts 1000 and 1040, OMO 251 comes within user 101's personal environment (1102) during a breathing cycle window (1107). During the breathing cycle windows, the software detects user 101's breathing (1110), and determines the parameters of user 101's breathing (1115). Based at least in part on the parameters of user 101's breathing, the software selects (1120) instructions from a look-up table (1150 to determine the parameters and/or behavior for OMO 251's next breathing cycle window (1107).

Further Behavior Models for OMO's Interactions with OMO's User

Breathing behaviors other than those just described may also be implemented. For example, the software may simulate a different breathing behavior of a type and/or at a time which is unexpected by user 101.

Other alternative implementations may be employed, such as for more complex modeling of user 101's breathing behavior, sensors for and responses to additional elements in the environment such as startling loud noises, and so forth. For example, alternative implementations may include intentional disruptions or changes in OMO 251's simulated breathing as an experimental or intentional stimulus to user 101, to affect user 101's degree or class of interaction with OMO 251, or to affect user 101's level of alertness or emotional state.

As an additional alternative, it may be desirable to simulate neurotic breathing by OMO 251, or to have OMO 251 store and learn new behaviors and breathing patterns based on the breathing behavior detected from user 101, including learning behaviors of user 101 that may be visceral or non-visceral: if OMO 251 produced a breathing behavior that user 101 perceived as OMO being in a frazzled emotional state, and user 101 attempted to calm OMO 251 down by consciously or viscerally altering her or his own breathing, OMO 251 may also be programmed to learn the user's breathing behavior and to simulate the user's breathing behavior in its own interactions and responses.

Objects having other shapes or no shape in particular, may be constructed to interact with a user in the same fashion as OMO 251. An example would be a baby doll that responded in the same manner as OMO when embraced by a child Other Species of the Present Invention UMO and AMO, examples of other species of the present invention, are discussed below. Details of implementation that are readily apparent are omitted. UMO and AMO are embodiments of exemplary species of the present invention in which the object detects a behavior of the user and in response produces an output that is not of the same class as the behavior that was detected. UMO further represents species in which the object's output is determined not only by characteristics of the user's personal environment, but also by characteristics of UMO's general environment.

UMO detects the breathing of the user when the user brings UMO into the user's personal environment, and in response produces purring sounds like those of a domestic cat.

AMO detects the pulse of the user when the user brings AMO into the user's personal environment, and in response produces varying electric field outputs to which the user responds viscerally.

Figure 12:
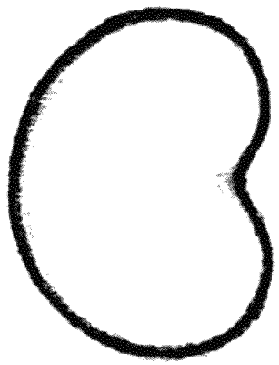
FIG. 12 shows views of preferred embodiments of UMO's and AMO's external shapes.
Figure 12:
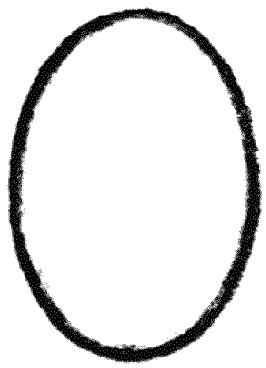
Figure 12:
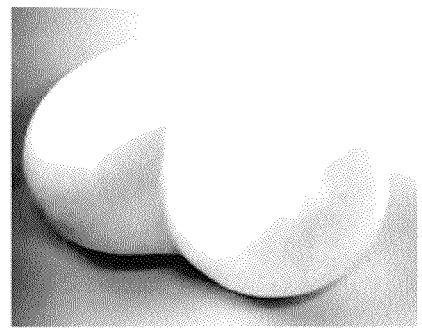
Figure 12:
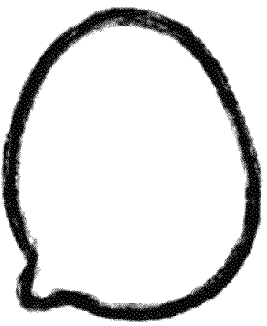
Figure 12:
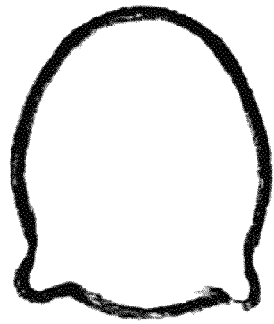
Figure 12:
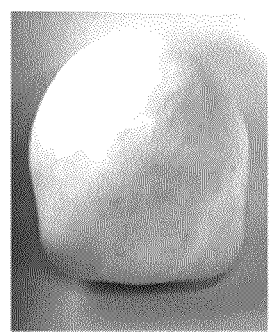

The presently-preferred embodiments of UMO and AMO each have an approximately ovoid organic shape somewhat similar to that of OMO, as shown in FIG. 12. 1210, 1220, and 1230 show respectively left, side, and oblique views of AMO's external shape. 1250, 1260, and 1270 show respectively left, side, and oblique views of UMO's external shape. Alternatively, UMO and AMO may each have any other shape or no shape in particular: for example, UMO may have a shape like a domestic cat. UMO and AMO may be brought within the user's personal environment in any fashion: for example, UMO's detector may be physically separate from UMO's output component.

Details of "UMO"

Figure 13:
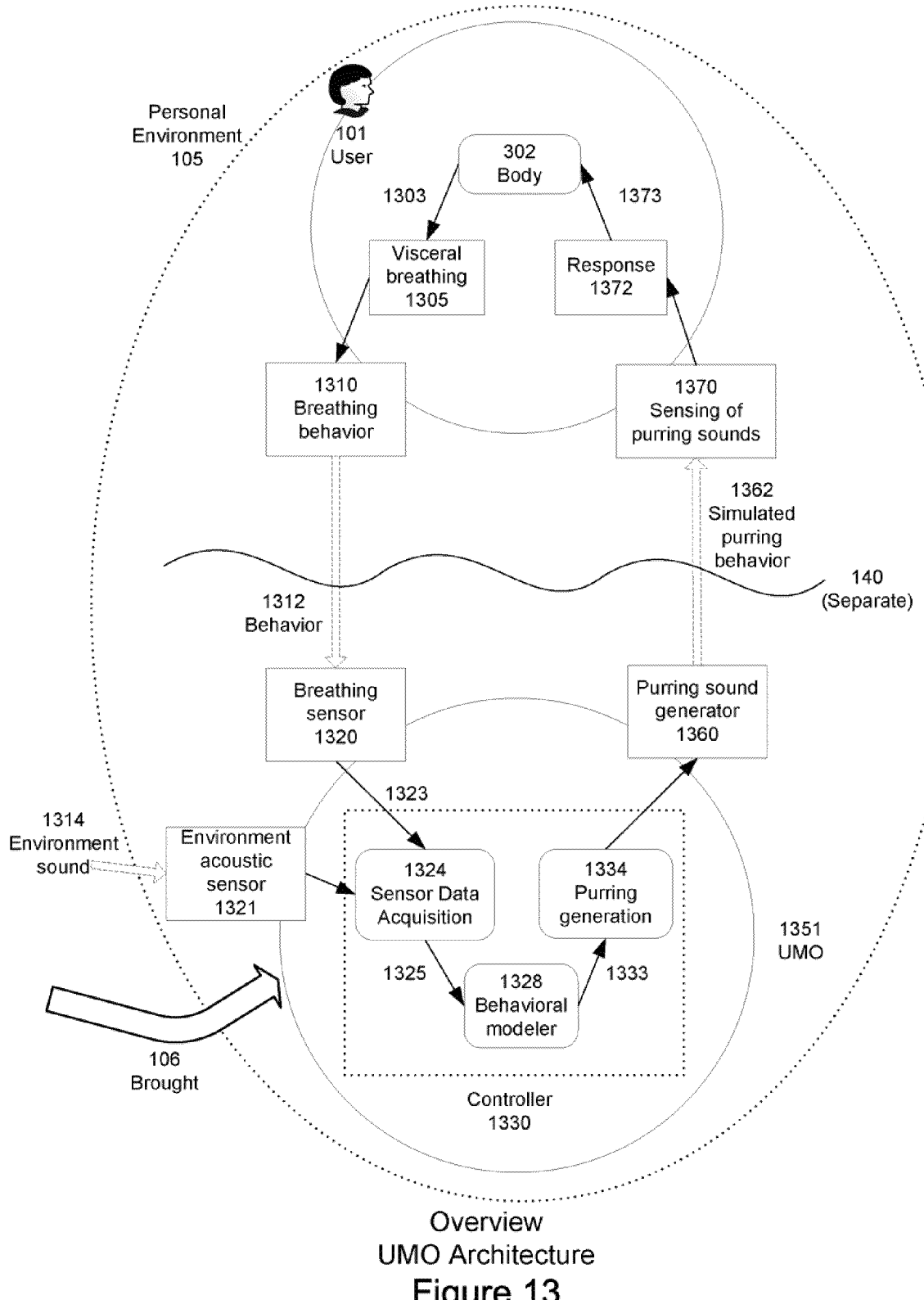
FIG. 13 shows in overview how UMO interacts with UMO's user.

FIG. 13 shows the interaction of UMO 1351 with UMO's user 101.

UMO 1351 detects the breathing of user 101 when the object has been brought into user 101's personal environment, and in response produces purring sounds like those of a domestic cat. The purring sounds depend in part on the breathing behavior of user 101, and also depend in part on aspects of sounds the object detects in UMO's general environment.

UMO 1351 is a separate object from user 101 as indicated by waved line 140. As illustrated by arrow 106, user 101 brings UMO 1351 into user 101's personal environment 105. User 101's body 302 exhibits user 101's visceral breathing behavior 1310, as indicated at 1305.

Breathing sensor 1320 of UMO 1351 detects user 101's breathing behavior 1312. UMO 1351 also has acoustic sensor 1321 that detects sounds 1314 from UMO's general environment: acoustic sensor 1321 and breathing sensor 1320 may be implemented with separate sensor components, or using a single sensor component such as by sensing breathing from the sounds of user 101's breathing.

UMO 1351 has controller 1330, which has sensor data acquisition component 1324, behavior modeler 1328, and purring generation component 1334.

Sensor data acquisition component 1324 obtains input 1323 from breathing sensor 1320 and also input from acoustic sensor 1321 and provides the values as shown at 1325 to behavior modeler 1328. Behavior modeler 1328 determines an output based on values indicated by 1325 and provides control signal 1333 to purring generation component 1334. Purring generation component 1334 in turn operates purring sound generator 1360 to produce simulated purring behavior output 1362.

Purring behavior output 1362 is sensed by user 101, as shown at 1370.

As indicated by 1372 and 1303, purring output behavior 1362 may also affect user 101's breathing rate viscerally, as indicated at 1303.

UMO 1351 may be implemented alternatively using any kind of detector that detects the user's breathing rate and sound from UMO's general environment and any kind of technique may be employed to generate the simulated purring sound from the inputs received from the detectors.

Purring Sounds UMO

Aspects of UMOs purring output are determined in part by purring-like aspects in the environment. UMO models purring using seven features found to be useful in detecting purring input: fundamental frequency (fo) estimation, power estimation, aperiodicity, spectral centroid, time-based modulation (o–Fs/8), time-based modulation (Fs/8–Fs/2), and modulation spectral centroid. The model is based on the inventor's determination that the frequency of purring is independent of purring rate in domestic cats, that a certain cat has a distinct spectral purr fingerprint that is present on different days and at different purr rates, and that there are alternating dominant pitches associated with the purr out and purr in, with an approximately 110 Hz dominant pitch.

Purring sounds are known to have soothing affective qualities: people usually find purring by cat pets to be soothing. Purring animals such as domestic cats in fact produce purring sounds in many situations. For example, cats may purr while being fed, and cats purr when injured: cats are known to heal faster than dogs, and the frequencies dominant in cat purrs are in the rate of frequencies found to stimulate bone, muscle, and ligament growth in other animals.

Other Versions of UMO

Other versions of UMO includes a version that produces "purring" sounds that are somewhere between cat purring and the "purrs" of machines that people experience as purring and soothing—cars, air conditioners . . . etc.; and a version which listens to a user's inner body sounds and visceral behaviors and responds with visceral behavior of its own in the form of sound and infrasound (in future, could also be movement and heat and/or other visceral behaviors).

Details of "AMO"

Figure 14:
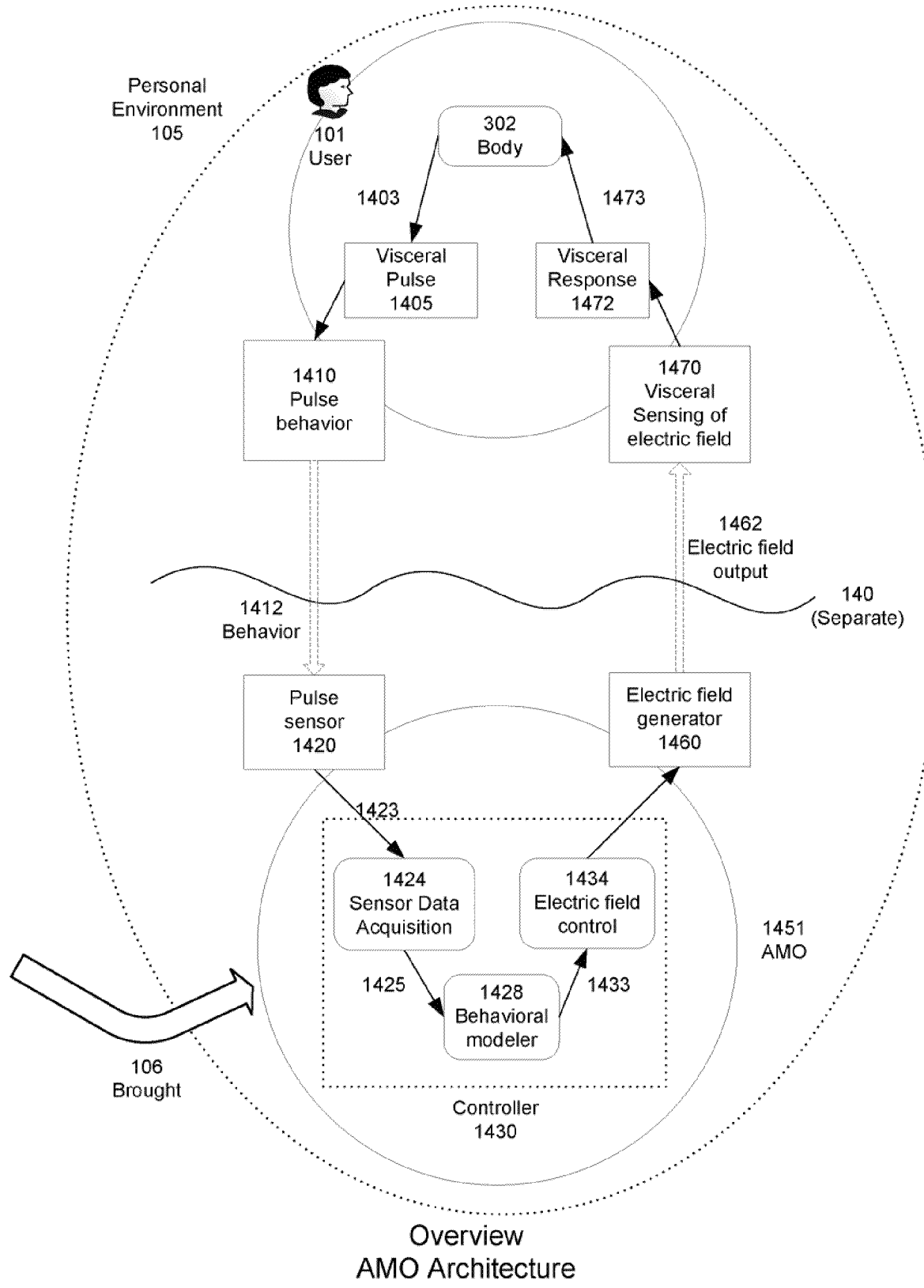
FIG. 14 shows in overview how AMO interacts with AMO's user.

FIG. 14 shows how AMO 1451 interacts viscerally with AMO's user 101.

AMO 1451 detects a visceral behavior of user 101 when user 101 brings AMO within user 101's personal environment, and in response produces varying electric field outputs to which user 101 responds viscerally.

As indicated by waved line 140, AMO 1451 is separate from user 101. User 101 brings AMO 1451 into user 101's personal environment 105, as indicated by arrow 106. User 101's body 302 controls user 101's visceral pulse rate, as indicated by 1405, resulting in visceral pulse rate behavior 1410. AMO 1451 has pulse sensor 1420 that detects user 101's visceral pulse rate behavior 1410, as shown at 1412. AMO 1451 has controller 1430 that has sensor data acquisition component 1424, behavioral modeler component 1428, and electric field control component 1434.

Pulse sensor 1420 provides input 1423 to sensor data acquisition component 1424, which makes the value available to behavior modeler 1428, as shown at 1425. Behavior modeler 1428 determines an output from output 1425, and provides signals 1433 to electric field control 1434. Control 1434 operates electric field generator 1460 to produce electric field output 1462.

AMO 1451 initially determines the blood volume pulse of user 101 holding AMO 1451 and synchronizes the period and phase of varying electric field output 1462 to that of user 101's heart pulse. Electric field output 1462 registers lightly in the small-signal inter-beat electric activity of user 101's heart, and may thus affect user 101: research has suggested that the psychological state of a person is represented by the electric pattern of the small high frequency signals that are carried on the lower frequency beat signal of user 101's heart activity.

Electric field output 1462 is sensed viscerally by user 101's body 302, as shown at 1470. User 101's body responds viscerally, as shown at 1472. 1403 and 1473 indicate that user 101's body 302 responds viscerally to output 1462 by altering the interbeat variation and small signals on the larger, lower frequency carrier signal of the user's visceral pulse rate.

AMO 1451 may of course be implemented employing any kind of detector, including detectors that detect pressure, chemical output, color, sound, an electric field, or motion and so forth, and the electric field output may be of any kind and produced in any fashion. AMO 1451 can, among other uses, be employed in experimental investigation of a user's visceral responses to electric fields.

Applications of Viscerally-Interacting Objects

The techniques disclosed herein have many applications, including:

Influencing the user's inner mental or emotional state:

For example, behaviors such as breathing not only a mirror of a person's inner state, but can be both consciously and subconsciously affective: for example, conscious breathing exercises are known to be helpful in calming a person or making a person more alert. Observations of OMO in use show it is possible to influence the physical and emotional state of the person interacting with the object as a user. OMO's simulated breathing can be used to direct the user's mental or emotional state to calm a user, and also to excite, disturb, or otherwise affect the user.

Therapeutic Use:

As will be readily appreciated, the techniques may be applied to therapy and diagnostics: for example, to calm a user or to focus a user's attention during psychotherapy and thus facilitate interaction with the therapist, to make a user more alert, or to calm an infant: the user of the object may herself/himself choose to interact with the object for these influences.

Dolls and Companion Robots:

The techniques and principles may naturally be employed to create a doll or companion robot that behaves like OMO, UMO, or AMO or other species of the present invention: for example they may be employed in creating a doll that responds with a simulated behavior to visceral aspects of a user behavior such as a hug or being picked up and held by the user.

Objects to which the User Comes:

UMO or AMO or other species may be implemented in a bed, a chair, a cabinet, or even a room. The object may come within the user's personal environment when the user lies in the bed, sits in the chair, or enters the cabinet or room.

Viscerally Interacting Objects which Interact with More than One User or with Other Viscerally Interacting Objects Viscerally interacting objects may of course be networked wirelessly or otherwise and may thus be used to communicate viscerally between near or distant users. An example would be a baby's crib that behaved like OMO and was linked via the network to an OMO which the mother was embracing and vice-versa. In the this configuration, the newborn feels the breathing of the mother as detected by the mother's OMO in the breathing motion produced by the crib and the mother feels the breathing of her baby as detected by the crib in the OMO the mother is embracing. Though separate from the baby, the mother feels the presence and wellness and breathing state of her baby. Networked viscerally interacting objects can be used by people who are far apart, or in the same room but unable to touch for social or emotional or other reasons.

Large viscerally interactive objects could interact with more than one person simultaneously. An example would be a sculpture which a number of people could sit on or lean against. If the sculpture was an OMO type viscerally interactive object, it would be possible for it to do things like get all of the people that are sitting on it or leaning against it breathing at the same rate. Of course, if a number of such multi-person OMO objects were networked together, the groups using the multi-person objects could be linked in the manner described above for the mother and child.

Conclusion

The foregoing Detailed Description has disclosed to those familiar with the technologies involved how to make and use objects that interact at a visceral level with the object's user when brought into the user's personal environment. The Detailed Description has also disclosed the best mode presently known to the inventor of implementing them. As will be immediately apparent to those familiar with the technologies involved, the principles of the invention described herein may be employed usefully in many different applications, for many different kinds of such objects, and for many different kinds of outputs, interactions, and behaviors including visceral behaviors. Many other species of the present invention may of course be constructed in addition to those described.

The object may have any kind of external form that is appropriate to the needs of the particular application, including no particular external form. Further, the behaviors may be combined with or employed in conjunction with another object. Behaviors and outputs may include combinations of behaviors or outputs. As one example, an object in the form of a cat doll may respond to a user's breathing and pulse and further behavior of any kind, and may simulate breathing and purring behaviors, and also output an electric field.

The object may employ the techniques and principles of the present invention in any number of combinations, and may combine any number of aspects of other embodiments. For, example, an embodiment may include all the aspects of OMO and may also purr like UMO, or an embodiment may include aspects of AMO and also detect the user's perspiration.

An object of the present invention may interact with more than one user, or a user with more than one such object, and an object may detect a behavior directly or indirectly. Any kind of detector may be used that detects any kind of behavior that can be detected, as well as any kind of output. Visceral behaviors may include visceral aspects of other behaviors, such as visceral aspects of a speaking voice. Objects may be brought into a user's personal environment in any fashion.

For all of the foregoing reasons, the Detailed Description is to be regarded as being in all respects exemplary and not restrictive, and the breadth of the inventions disclosed herein is to be determined not from the Detailed Description, but rather from the attached claims as interpreted with the full breadth permitted by the patent laws.

The invention claimed is:

1. Apparatus comprising, in combination:
    an artificial sensor, the sensor being configured to detect human breathing by a human user;
    an artificial breathing mechanism that comprises an interior cavity and an actuator, which actuator is configured to actuate simulated breathing by the mechanism, the simulated breathing comprising moving air in and out of the cavity though a hole that communicates with ambient atmosphere outside the mechanism; and
    an artificial controller, the controller being adapted
        to receive inputs from the sensor
        to analyze the inputs to determine at least one of a plurality of parameters, the plurality of parameters comprising frequency of the human breathing, and time delta between start of breath intake for the human breathing and start of breath intake for the simulated breathing, and
        to control the simulated breathing of the mechanism.

2. The apparatus of claim 1, wherein the parameters further comprise magnitude of the human breathing.

3. The apparatus of claim 2, wherein the controller is adapted to adjust, in increments, frequency, magnitude and phase of the simulated breathing to move toward the frequency, magnitude and phase, respectively, of the human breathing.

4. The apparatus of claim 1, wherein the parameters further comprise ratio of duration of intake breath of the human breathing to the duration of exhale breath of the human breathing.

5. The apparatus of claim 1, wherein the controller is adapted to adjust the simulated breathing to be entrained with the human breathing.

6. The apparatus of claim 1, wherein the controller is adapted to adjust, in increments, parameters of the simulated breathing to move toward the parameters of the human breathing.

7. The apparatus of claim 6, wherein the controller is adapted to adjust the parameters at periodic time intervals, rather than continually.

8. The apparatus of claim 1, wherein the controller is adapted to control a first adjustment, in which the simulated breathing is entrained with the human breathing, and is further adapted to control a second adjustment, in which the simulated breathing is slowed down.

9. The apparatus of claim 8, wherein the second adjustment is performed gradually, to maintain entrainment with the human breathing of the user.

10. The apparatus of claim 1, wherein the apparatus is covered at least in part by an elastomeric skin.

11. The apparatus of claim 1, wherein the exterior shape of the apparatus is ovoid.

12. The apparatus of claim 1, wherein the sensor is configured to provide logarithmic response across a range of sensed force.

13. The apparatus of claim 1, wherein the sensor comprises QTC force sensors.

14. The apparatus of claim 1, wherein the sensor comprises fiber-optic bend sensors.

15. The apparatus of claim 1, wherein the actuator comprises an electric motor in a motor silencing housing.

16. The apparatus of claim 1, wherein the mechanism further comprises flexible structural elements, and the actuator is configured to change the curvature of the flexible strucural elements during the simulated breathing.

* * * * *